July 18, 1950 W. P. SCHMITTER 2,516,078
GEAR SET
Filed Oct. 30, 1947 3 Sheets-Sheet 1

INVENTOR
WALTER P. SCHMITTER
BY *Rasmus Brunn*
ATTORNEY

July 18, 1950 — W. P. SCHMITTER — 2,516,078
GEAR SET
Filed Oct. 30, 1947 — 3 Sheets-Sheet 2

INVENTOR.
WALTER P. SCHMITTER
BY
ATTORNEY

July 18, 1950 W. P. SCHMITTER 2,516,078
GEAR SET
Filed Oct. 30, 1947 3 Sheets-Sheet 3

INVENTOR.
WALTER P. SCHMITTER
BY
ATTORNEY

UNITED STATES PATENT OFFICE 2,516,078

GEAR SET

Walter P. Schmitter, Wauwatosa, Wis., assignor to The Falk Corporation, Milwaukee, Wis., a corporation of Wisconsin Application October 30, 1947, Serial No. 782,982

5 Claims. (Cl. 74—665)

This invention relates to gear sets.

One object of the present invention is to provide an improved gear set for driving a pair of concentric shafts in opposite directions.

The invention may be utilized to particular advantage in driving the counter-rotating propellers of helicopters, airplanes and the like, although other uses are contemplated.

Other more specific objects and advantages will appear, expressed or implied, from the following description of three illustrative embodiments thereof.

The gear sets selected for illustration include many of the advantageous features disclosed in my copending application Serial No. 782,981, and in the copending application of Louis W. Falk, Serial No. 783,009, both filed October 30, 1947.

Figure 1:
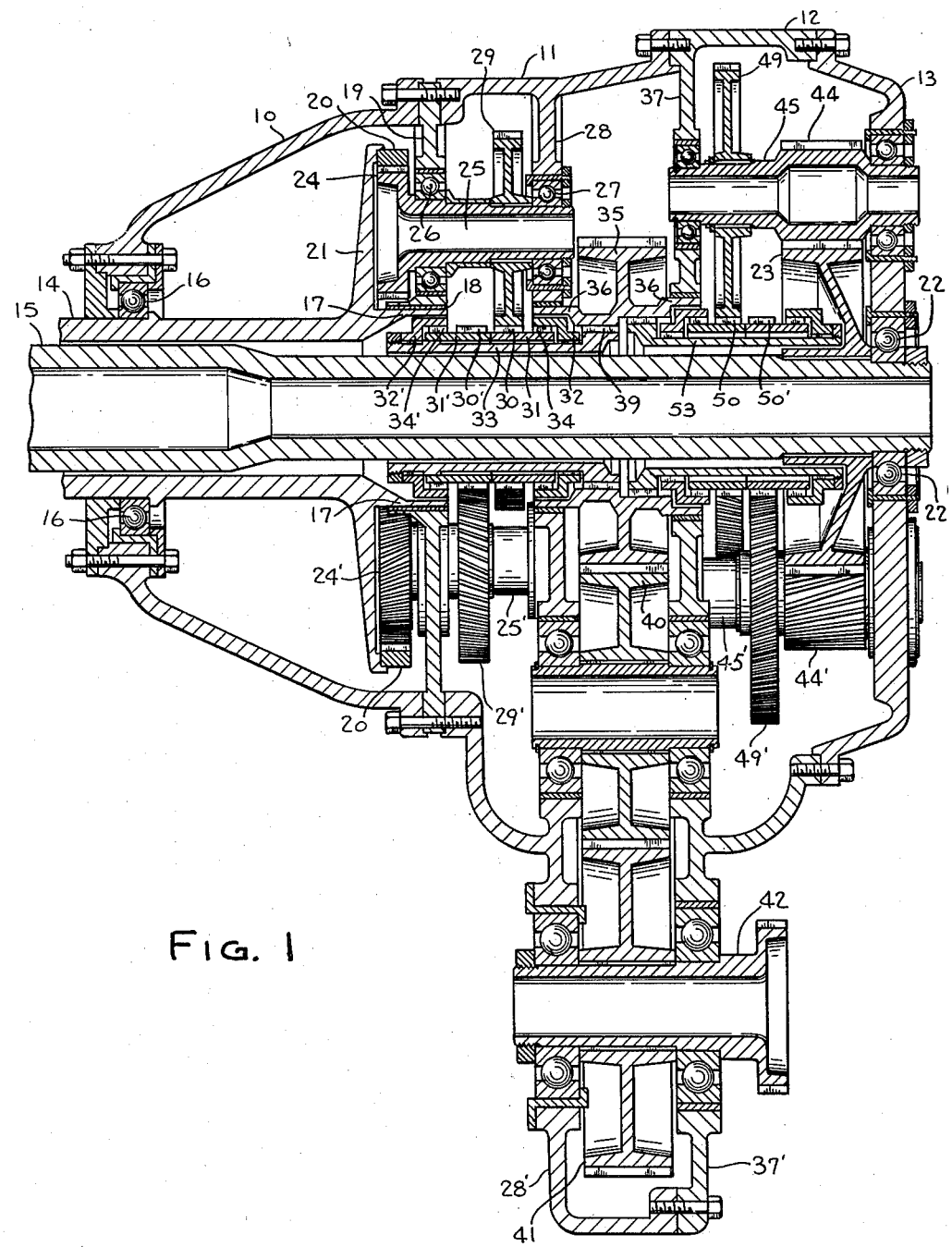
Figure 1 is a longitudinal sectional view of gear set constructed in accordance with the present invention.

The gear set shown in Fig. 1 comprises a housing including several separable sections 10, 11, 12 and 13. Two concentric oppositely rotating shafts 14 and 15 project from the forward section 10 of the housing.

The outer hollow shaft 14 is journaled in a suitable bearing 16 fixed in the forward housing section 10, and a tubular extension 17 at the inner end of shaft 14 is journaled in a sleeve bearing 18 fixed in an appropriate supporting ring 19 provided within the housing. Shaft 14 is driven by a relatively large internal gear 20 fixed to a disk 21 carried by the shaft.

Shaft 15 extends through the shaft 14 and is shown journaled at its rear end in a suitable bearing 22 fixed in the rear housing section 13. Shaft 15 is driven by an external gear 23 keyed or otherwise fixed thereto.

The gear 20 is driven by a group of three equally spaced single helical pinions 24 meshing therewith. Each pinion 24 is carried by a shaft 25 journaled in bearings 26 and 27 respectively fixed in the supporting ring 19 and an inwardly projecting web 28 formed within the housing section 11. Each of the three shafts 25 carries a gear 29 keyed or otherwise fixed thereto. The three gears 29 mesh with a centrally disposed single helical driving pinion 30.

The gear 20 is additionally driven in a similar manner from a second single helical pinion 30', through a group of three equally spaced single helical gears 29' meshing with the latter, each of the gears 29' being fixed to a shaft 25' carrying a pinion 24' meshing with gear 20.

The pinions 30 and 30' are carried by the adjacent ends of separate substantially aligned sleeves 31 and 31' loosely confined between a pair of driving rings 32 and 32' keyed or otherwise fixed to the opposite ends of a sleeve 33 that loosely encircles the shaft 15 and extends loosely through both of the pinion sleeves 31 and 31'. Each of the pinion sleeves is provided with a set of teeth 34 or 34' in meshing engagement with corresponding teeth formed within one of the driving rings 32 or 32', the arrangement being substantially as disclosed in the above identified application of Louis W. Falk. As therein indicated, the pinions 30 and 30' are free to float radially relative to each other, both are free to float axially with the sleeve 33, and both are rotatable as a unit with the sleeve 33.

In this instance the sleeve 33, and consequently the pinions 30 and 30', are connected to rotate with a gear 35, whose hub extensions 36 are respectively journaled in the web 28 and in a similar web 37 projecting inwardly from the housing section 12. For this purpose a set of straight spur teeth 38 are provided on one end of the sleeve 33 which mesh with corresponding teeth formed within the hub of gear 35. The gear 35 is driven through an appropriate train of gears 40 and 41 from a laterally offset drive shaft 42 journaled in suitable extensions 28' and 37' of the respective webs 28 and 37.

The helix angle of the gears 29 of one group and of the pinion 30 is equal to but of opposite hand from that of the other pinion 30' and gears 29' of the other group, so that the pinions 30 and 30' automatically assume an axial position such as to equalize the torque load between the two groups of gears 29 and 29', the teeth 34 or 34' on each pinion sleeve being angularly disposed, each preferably at an angle equal to the helix angle of the related pinion 30 or 30'. Also, each pinion 30 and 30' automatically assumes a radial position such as to equalize the load between the three gears 29 or 29' of each group. Consequently the total torque load transmitted from the gear 35 through the sleeve 33 is equally divided between the six gears 29 and 29', and each of the several pinions 24 and 24' transmits an equal one sixth part of the total torque load transmitted through the internal gear 20.

It will be noted that through the mechanism above described the shaft 14 is driven from the gear 35 at a speed greatly below that of gear 35 and in a direction opposite to that of the latter. Similar mechanism is provided for driving the external gear 23 from the gear 35 and in the same direction as the latter so that the shaft 15 is driven in a direction opposite that of the shaft 14.

In this instance single helical pinions 50 and 50' of opposite hand are simultaneously driven from the gear 35 through a sleeve 53 in exactly the same manner as hereinabove explained with respect to pinions 30 and 30', both pinions being free to float axially as a unit and each being free to float radially relative to each other. Pinion 50 meshes with a group of three equally spaced single helical gears 49, each carried by a shaft 45 having a pinion 44 thereon meshing with the gear 23. Pinion 50' meshes with a group of three equally spaced gears 49', each carried by a shaft 45' having a pinion 44' thereon meshing with the gear 23. As in the similar gearing hereinabove described, the pinions 50 and 51' function to automatically divide the total torque load between the six gears 49 and 49', and pinions 44 and 44' are preferably so proportioned as to effect rotation of the gear 23 and shaft 15 at the same rate as the shaft 14 but in reverse direction.

Figure 2:
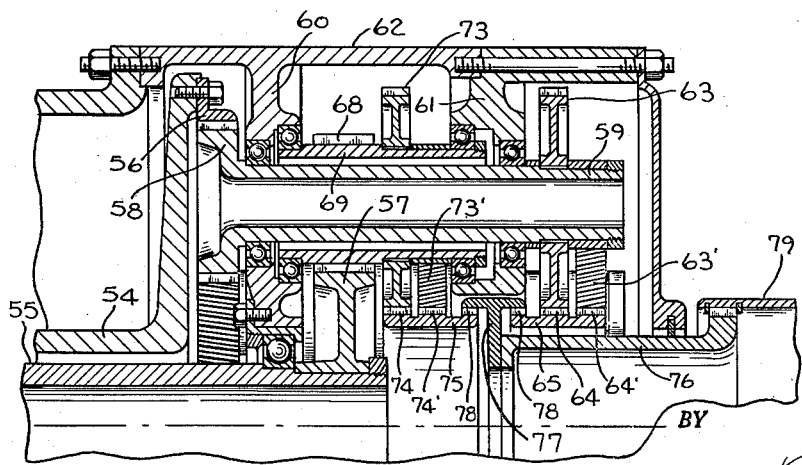
Fig. 2 is a fragmentary sectional view of another embodiment of the invention.

The gear set shown in Fig. 2 is similar in many respects to that shown in Fig. 1 except that the parts are rearranged to permit disposition of the drive shaft in substantial alignment with the driven shafts. The two driven shafts are shown at 54 and 55, shaft 54 being driven by an internal gear 56, and shaft 55 being driven by an external gear 57. The internal gear 56 is driven by six equally spaced pinions 58 meshing therewith and carried by separate shafts 59 journaled in suitable supporting rings 60 and 61 provided within the housing 62.

A group of three single helical gears 63, respectively keyed or otherwise fixed to the rear ends of alternate shafts 59, mesh with a centrally disposed single helical pinion 64. Similarly, each of the remaining shafts 59 carries at its rear end one of a group of three single helical gears 63' which mesh with a second single helical pinion 64', as in the device disclosed in Fig. 1, the helix angle of the pinion 64' being equal to but of opposite hand from that of the pinion 64.

In this instance both pinions 64 and 64' are formed on a single ring 65 which is free to float axially, so that the torque toad transmitted through the ring 65 is equally divided between the two pinions 64 and 64' and equally distributed by them to the two groups of gears with which they mesh. Also, the two pinions 64 and 64' are free to float radially in a manner to automatically divide and distribute between the gears 63 and 63' of each group the torque load transmitted through that pinion 64 and 64' with which the group of gears mesh. It will thus be noted that each of the pinions 58 transmits an equal one sixth part of the entire torque load transmitted to the internal gear 56, all in much the same manner as disclosed in the device of Fig. 1.

Likewise, the external gear 57, carried by the shaft 55, is driven in much the same manner from a pair of single helical pinions 74 and 74' carried by a ring 75, which is also free to float both axially and radially. The helix angles of the pinions 74 and 74' are equal but of opposite hand, and each pinion meshes with a separate group of three equally spaced like gears 73 or 73'. Each of the gears 73 or 73' is keyed or otherwise fixed to a separate shaft 69, which loosely encircles one of the shafts 59 and which is journaled at opposite ends in the supporting rings 60 and 61. A pinion 68 on each of the six shafts 69 meshes with and drives the external gear 57, to thereby drive the shaft 55 in a direction opposite to that of the shaft 54. Again the arrangement is such that the driving pinions 74 and 74' assume axial and radial positions such as to equally divide and distribute the load between the six gears 73 and 73', so that each of the pinions 68 transmits an equal one sixth part of the total load transmitted to the gear 57 and shaft 55.

In this instance both pinion rings 65 and 75 are simultaneously driven from a shaft 76, preferably hollow, which is substantially aligned with the driven shafts 54 and 55. The shaft 76 is shown equipped at its inner end with a ring 77 disposed between the rings 65 and 75 to which it is flexibly connected in driving relation through sets of teeth 78 carried by the ring 77 and meshing with corresponding teeth formed on the pinion rings 65 and 75. The shaft 76 is preferably driven through a flexible coupling 79 of any standard or approved type so as to render the inner end of the shaft 76 free to float in a manner to avoid interference with the desired free floating action of the pinion rings 65 and 75.

Figure 3:
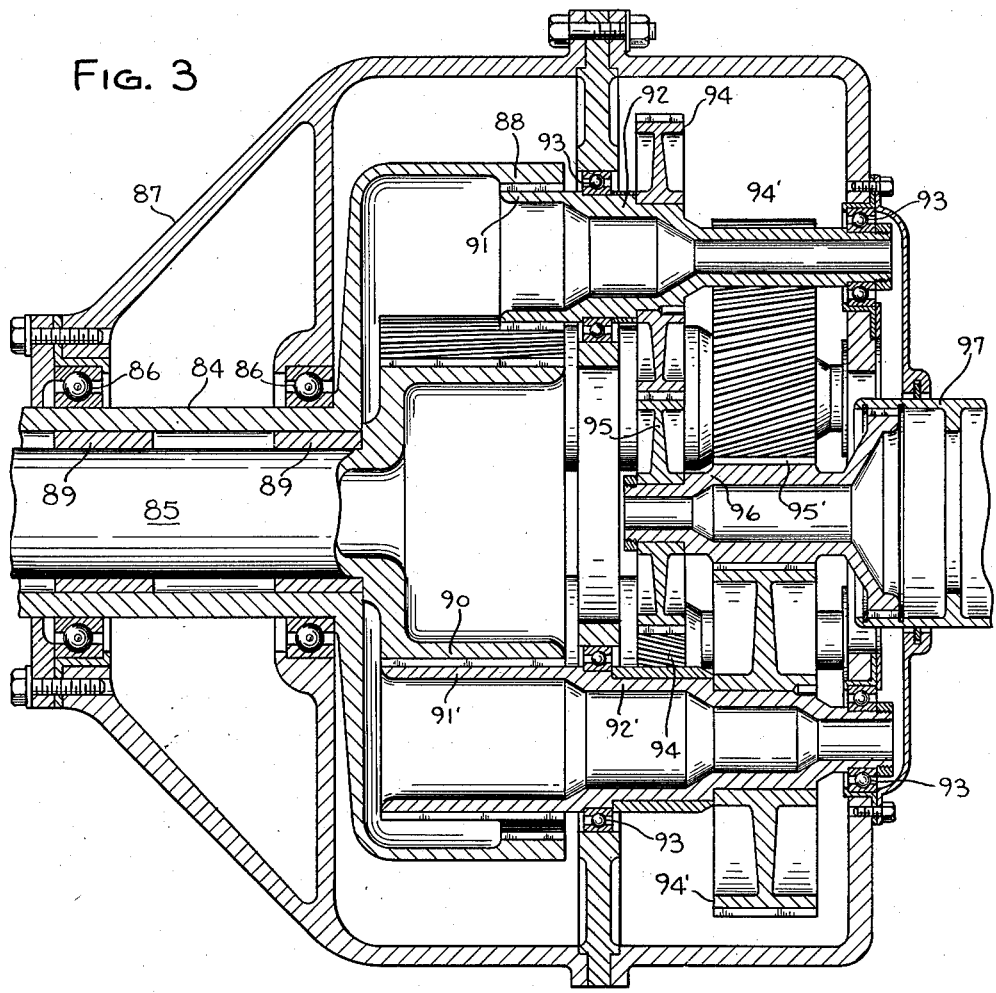
Figs. 3 and 4 are views similar to Fig. 1 of other embodiments.

The gear set shown in Fig. 3 also involves two concentric counter-rotating driven shafts 84 and 85. Shaft 84 is hollow and is journaled in suitable bearings 86 in the forward section 87 of the housing. Shaft 84 is driven by an internal gear 88 carried thereby. Shaft 85 extends through shaft 84 and is journaled in bearings 89 therein. Shaft 85 is driven by an external gear 90 carried thereby.

A group of three equally spaced pinions 91 mesh with the internal gear 88; and a similar group of three pinions 91' mesh with the external gear 90. Pinions 91 are carried by the forward ends of separate shafts 92 journaled in fixed bearings 93 within the housing; and pinions 91' are carried by similarly mounted shafts 92' individually disposed between successive shafts 92. Each shaft 92 carries one of a group of three single helical gears 94 disposed to mesh with a central pinion 95; and each shaft 92' carries one of a group of three single helical gears 94' disposed to mesh with a central pinion 95'. Both pinions 95 and 95' are carried by a single drive shaft 96 which is free to float both axially and radially. The pinion shaft 96 is shown connected to a flexible coupling 97 of any standard or approved type through which the shaft is driven in a manner not to interfere with the free floating condition thereof.

It will be noted that the two shafts 84 and 85 are simultaneously driven in opposite directions, shaft 84 being driven from pinion 95 through gears 94, pinions 91 and internal gear 88, and shaft 85 being driven from pinion 95' through gears 94', pinions 91' and external gear 90. The several pinions and gears are preferably so proportioned as to effect rotation of the shafts 84 and 85 at the same speeds.

The helical gears 94 and the meshing pinion 95 are of opposite hand from that of gears 94' and pinion 95', and since both pinions are free to shift axially, they automatically assume a position such as to equalize the axial thrust reactions imposed by the two groups of gears. The helix angle of one pinion and its meshing gears is preferably so related to that of the other pinion and its meshing gears that the power transmitted through the pinion shaft 96 is equally divided, an equal one half part being transmitted through each pinion 95 or 95' to the group of gears 94 or 94' with which it meshes. Consequently, one half of the power transmitted through the drive shaft 96 is thus transmitted to each of the shafts 84 and 85.

Also, since the pinions 95 and 95' are free to shift radially, they automatically assume a position such that the total load transmitted through each is equally divided between the individual pinions 94 and 94' of each group, and each of the pinions 91 or 91' transmits its proportional part of the torque load to the gear 88 or 90 with which it meshes.

The gear set shown in Fig. 4 like those hereinabove described includes two coaxial, counter-rotating, driven shafts 104 and 105, shaft 104 carrying an internal gear 108 and shaft 105 carrying an external gear 110. Gear 108 is driven by three equally spaced pinions 111, each carried by a shaft 112 suitably journalled in the housing 107 and driven by a gear 114 carried thereby. Likewise, gear 110 is driven by three equally spaced pinions 111', each carried by a shaft 112' driven by a gear 114' thereon. The three gears 114 of one group mesh with a centrally disposed driving pinion 115 and the three gears 114' of the other group mesh with a separate similarly disposed driving pinion 115'.

Also, as in the form of gear set shown particularly in Fig. 3, the two driving pinions 115 and 115' are free to float radially, so as to equally distribute the torque load transmitted through each to the three gears 114 or 114' with which they mesh, and so that the three pinions 111 transmit substantially equal torques to the gear 108 and the three pinions 111' transmit substantially equal torques to the gear 110. As distinguished from the Fig. 3 arrangement, however, the total torque transmitted to one gear 108 in the Fig. 4 arrangement bears no definite relation to the total torque transmitted to the other gear 110, so that each shaft 104 and 105 is positively driven, regardless of the presence or absence of torque load on the other shaft.

For this purpose the two driving pinions 115 and 115' are shown separately driven through suitable connectors 116 and 116' from a suitable flexible coupling 117. In this instance each connector is shown as a tubular structure having toothed driving engagement, as at 118 or 118', with the coupling 117 and also similar engagement at 119 or 119' with its associated pinion 115 or 115'.

Figure 4:
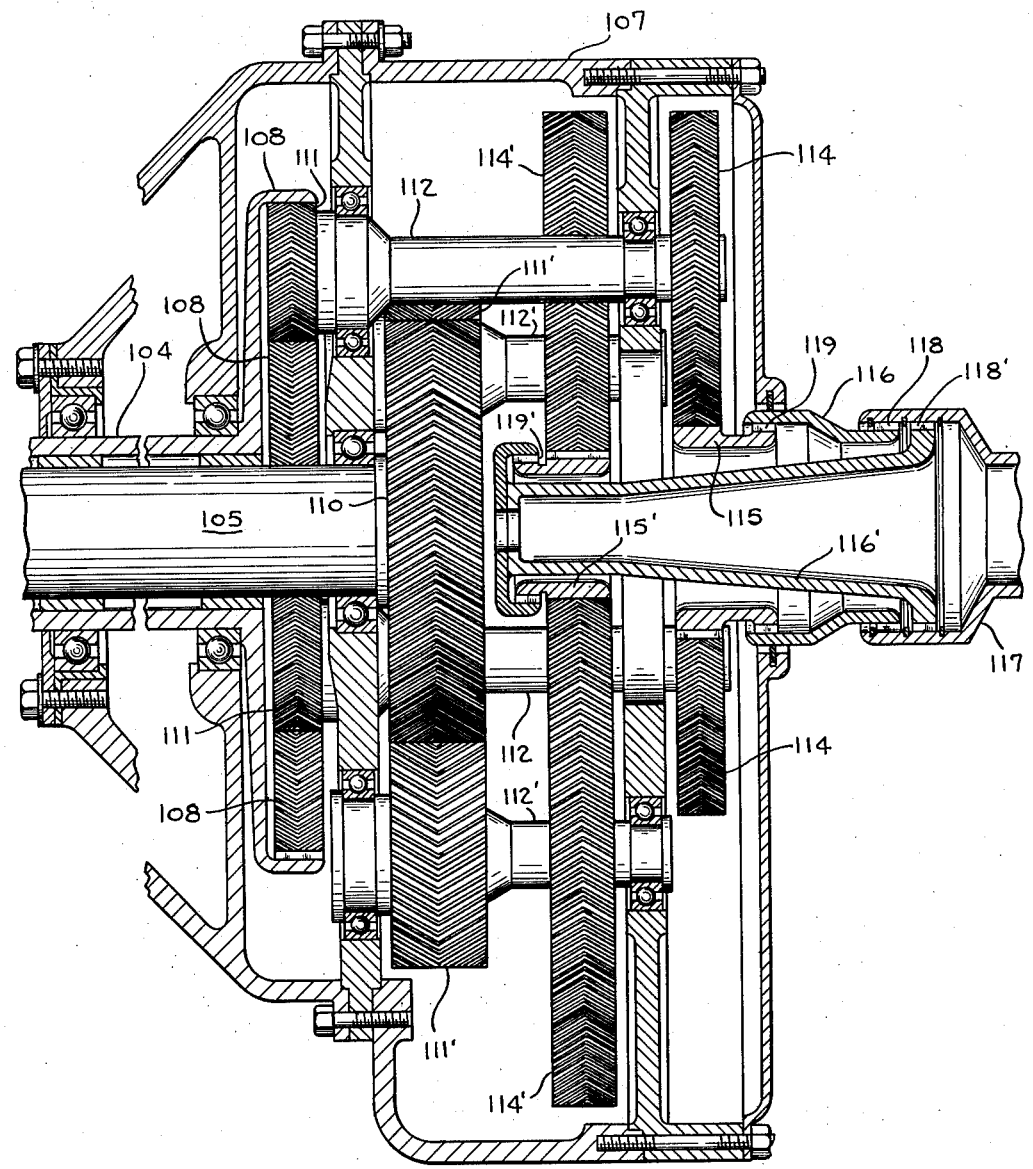

In the gear set of Fig. 4 the several gears and pinions are shown as of double-helical type, the several shafts 112 and 112' being free to float axially to permit the pinions 111 and 111' to accommodate themselves to the gears 108 and 110, respectively; and the two driving pinions 115 and 115' are also free to float axially for a like purpose.

Various changes may be made in any of the embodiments of the invention hereinabove specifically described without departing from or sacrificing the advantages of the invention as defined in the appended claims.

I claim:

1. In a gear set for driving two driven shafts from a single driver, said gear set comprising a pair of gears connected in driving relation with said driven shafts respectively, a group of gears each separately connected in driving relation with one of said pair of gears, a second group of gears each separately connected in driving relation with the other of said pair of gears, and means driven by said driver for simultaneously driving both of said groups of gears, said last named means including pinions engaged with said groups of gears and reacting thereon to distribute between the gears of each group the torque load imposed upon the gear to which said group of gears is connected.

2. In a gear set for driving two coaxial counter-rotating shafts from a single driver, said gear set comprising a pair of coaxial gears connected in driving relation with said shafts respectively, a group of gears each separately connected with one of said coaxial gears to drive the latter in one direction, a second group of gears each separately connected to the other of said coaxial gears to drive the latter in the opposite direction, and means driven by said driver for driving both of said groups of gears, said last named means including pinions engaged with said groups of gears and reacting thereon to distribute between the gears of each group the torque load imposed upon the gear to which said group of gears is connected.

3. In a gear set for driving two coaxial counter-rotating shafts from a single driver, said gear set comprising an internal gear for driving one of said shafts, an external gear for driving the other of said shafts, a group of gears each separately connected with said internal gear to drive the same in one direction, a second group of gears each separately connected with said external gear to drive the same in the opposite direction, and means driven by said driver for simultaneously driving both of said groups of gears, said means including pinions respectively engaged with said groups of gears.

4. In a gear set for driving two coaxial counter-rotating shafts from a single driver, said gear set comprising an internal gear for driving one of said shafts, an external gear for driving the other of said shafts, a circular group of pinions each meshing with said internal gear, a second circular group of pinions each meshing with said external gear, two groups of gears, each of the gears of each group being separately connected in driving relation with one of said pinions, a pinion meshing with the gears of one of said groups, a second pinion meshing with the gears of the other group, and means driven by said driver for simultaneously driving said last named pinions.

5. In a gear set for driving two coaxial counter-rotating shafts from a single driver, said gear set comprising an internal gear for driving one of said shafts, an external gear for driving the other of said shafts, a circular group of pinions each meshing with said internal gear, a second circular group of pinions each meshing with said external gear, two groups of gears, each of the gears of each group being separately connected with one of said pinions, a driving pinion engaged with the gears of one group and radially yieldable to substantially equalize the torque reactions therebetween, a second driving pinion engaged with the gears of the other group and radially yieldable to substantially equalize the torque reactions therebetween, and means through which said driving pinions are simultaneously driven by said driver.

WALTER P. SCHMITTER.

REFERENCES CITED

The following references are of record in the file of this patent:

UNITED STATES PATENTS

| Number | Name | Date |
|---|---|---|
| 1,740,756 | Weiss | Dec. 24, 1929 |
| 1,949,643 | Banan | Mar. 6, 1934 |
| 2,372,883 | Daub | Apr. 3, 1945 |